UNITED STATES PATENT OFFICE.

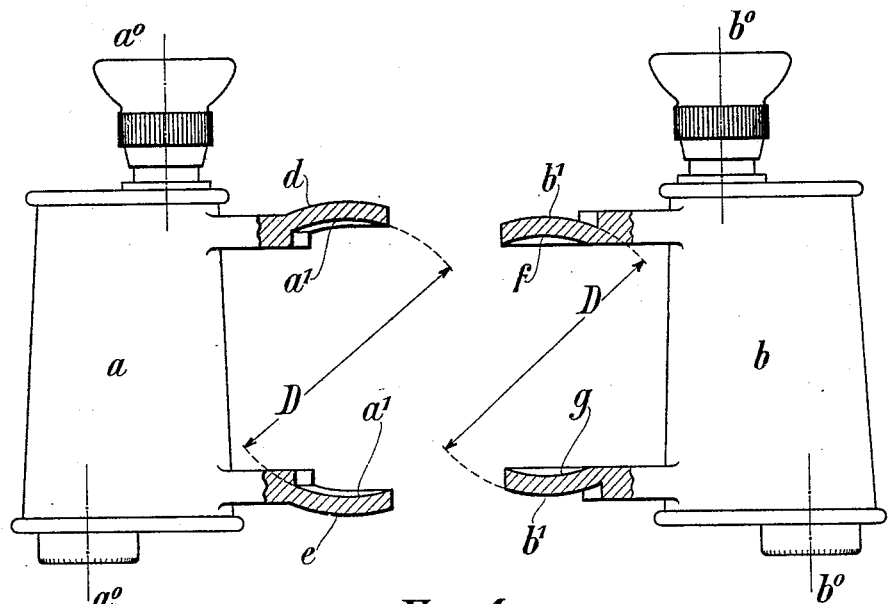
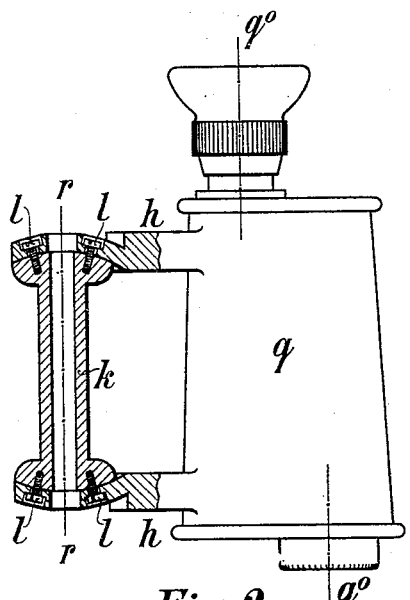
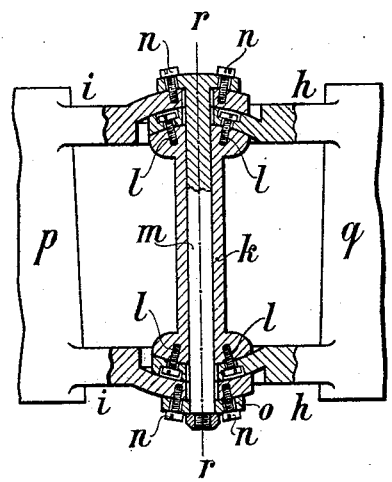

RUDOLF STRAUBEL, OF JENA, GERMANY, ASSIGNOR TO THE FIRM OF CARL ZEISS, OF JENA, GERMANY.

HINGED DOUBLE TELESCOPE.

962,929.  Specification of Letters Patent.  Patented June 28, 1910.

Application filed May 12, 1908. Serial No. 432,392.

*To all whom it may concern:*

Be it known that I, RUDOLF STRAUBEL, a citizen of the German Empire, and residing at Carl-Zeiss strasse, Jena, in the Grand Duchy of Saxe-Weimar, Germany, have invented a new and useful Hinged Double Telescope, of which the following is a specification.

The invention consists in a hinged double telescope, the hinge construction of which facilitates remarkably the production of parallelism between the optical axes of the two telescopes and the hinge axis. With this hinge construction, in neither telescope the hinge journal or bearing surface or surfaces need to be located relatively to the hinge arm or arms, before the optical parts have been fixed in the telescope casing and thus the position of the optical axis of the telescope relatively to the casing has been determined, so that such location can be realized in accordance with the direction of the optical axis. In this way neither a loosable connection between the casing of each telescope and its hinge arm or arms nor shifting any of its optical parts is required for producing the parallelism of the three axes.

The essential features of the new hinged double telescope is, that the annular hinge abutment surfaces are spherical with a common center in the hinge axis. It will be understood, that a pair of hinge abutment surfaces means two surfaces by which a hinge arm of one telescope and a hinge arm of the other telescope are in surface contact and which surround the hinge bolt and abut in one direction the relative displacement of the telescopes parallel to the axis of the hinge. When each telescope has two hinge arms and when consequently two pairs of hinge abutment surfaces exist, these two pairs are concentric to each other and may lie either on the same side or on opposite sides of the center. In the latter case both pairs may have the same radius, *i. e.*, be zones of the same sphere. Further such spherical abutment surfaces may also be used in the ordinary case, that the arms of one telescope embrace those of the other, as the said surfaces are small enough to allow of the spherical joint being closed and opened by a relative rotation of the telescopes about the center of the sphere in the median plane of the double telescope. The annular surface on the opposite side of each hinge arm may be plane and perpendicular to the axis of the hinge or likewise spherical and in this case preferably concentric to the abutment surface of the same arm. An arrangement of the latter kind with the two hinge arms of one telescope embracing the hinge arms of the other telescope may be developed to form a hinge which is in such a way adjustable that the parallelism of the three axes can be restored, when the direction of one of the optical axes should have been altered by an accident. For this purpose a hinge bearing is adjustably fitted to the inner spherical surfaces of the embraced arms and the hinge bolt to the outer spherical surfaces of the embracing arms.

In the accompanying drawing: Figure 1 is a sectional elevation of the separate telescopes of a prism field glass constructed according to the invention, the hinge arms still requiring to be bored. Fig. 2 is a sectional elevation of one telescope of another prism field glass constructed according to the invention. Fig. 3 is a sectional elevation of the hinge part of a complete field glass one telescope of which is shown in Fig. 2.

Referring to the example Fig. 1 of the two telescopes $a$ and $b$, the one $a$ is provided with the embracing and $b$ with the embraced hinge arms. Both telescopes are fitted with the optical parts through which the direction of the optical axis $a^0$ $a^0$ in $a$ and that of the optical axis $b^0$ $b^0$ in $b$ are determined. There are further the spherical abutment surfaces $a^1$ $a^1$ and $b^1$ $b^1$, having the diameter D, already worked, so that both telescopes can be united to form a spherical joint and hereafter adjusted with the two axes $a^0$ $a^0$ and $b^0$ $b^0$ parallel to each other. After such junction and adjustment are made, the hinge surfaces can be located. For this purpose the bores in the hinge arms are worked, all four in one operation and so that their common axis $c$ $c$, which becomes the axis of the hinge, is parallel to the two optical axes $a^0$ $a^0$ and $b^0$ $b^0$ and includes the common center of the abutment surfaces $a^1$ $a^1$ and $b^1$ $b^1$. The other surfaces of the hinge arms, $d$ and $e$ on the telescope $a$ and $f$ and $g$ on the telescope $b$, now may be worked as plane annular surfaces perpendicular to the axis of the hinge, but in the drawing it has been supposed that they are spherical and concentric to the abutment surfaces, together with which they may have been worked. To obtain a complete field glass, a sleeve may be provided to connect the embraced hinge arms and a hinge bolt may be tightly fitted in the bores of the arms and secured to the embracing arms.

In the example Figs. 2 and 3 all surfaces can be worked before the telescopes are fitted with the optical parts. The hinge arms $h$ $h$ and $i$ $i$ are essentially shaped as in Fig. 1. Their bores not being used as hinge surfaces, have a comparatively great diameter. A special bearing sleeve $k$ is fitted to the inner spherical surfaces of the embraced arms and adjustably secured to these arms by means of screws $l$ having some play in the arms. In a similar manner the hinge bolt $m$ is connected with the embracing arms by means of screws $n$ which pass through its head fitted to the outer arm surface and through a ring $o$ fitted on the bolt at its opposite end and to the outer surface of the other arm.

The location of the hinge surfaces, the journal or bolt surface in the telescope $p$ and the bearing surface in the telescope $q$, may be performed as follows. After the separate telescopes are fitted with the optical parts, in the telescope $q$ shown in Fig. 2 the bearing sleeve $k$ is adjusted to have its axis $r$ $r$ parallel to the optical axis $q^0$ $q^0$. Then the two telescopes are united and their spherical joint adjusted until the optical axes of both telescopes are parallel to each other. Hereafter the hinge bolt $m$ is introduced into the bearing sleeve $k$ and secured to the embracing arms in the manner shown in Fig. 3. Whenever the parallelism of the three axes should get lost, the method just described will allow of restoring it.

I claim—

1. A hinged double telescope the two telescopes of which are rotatable about a common hinge axis by means of bored hinge arms with spherical hinge abutment surfaces, the hinge axis having a fixed position relatively to each telescope and the abutment surfaces having a common center in the said axis.

2. A hinged double telescope of the two telescopes of which each has two bored hinge arms, the arms of one telescope embracing with concave spherical hinge abutment surfaces the arms of the other telescope provided with corresponding convex abutment surfaces, these four abutment surfaces being zones of the same sphere with the center in the axis of the hinge.

3. A hinged double telescope of the two telescopes of which each has two bored hinge arms, the arms of one telescope embracing with concave spherical abutment surfaces the arms of the other telescope provided with corresponding convex abutment surfaces, these four abutment surfaces having a common center in the axis of the hinge, each arm having on the opposite side another spherical surface concentric to its abutment surface, the hinge bolt being fitted to the outer spherical surfaces of the embracing arms and adjustably secured to these arms and a bearing sleeve being fitted to the inner spherical surfaces of the embraced arms and adjustably secured to these arms.

RUDOLF STRAUBEL.

Witnesses:
PAUL KRUGER,
FRITZ SANDER.